(12) United States Patent
Richter

(10) Patent No.: US 9,829,301 B2
(45) Date of Patent: Nov. 28, 2017

(54) BALL-SHAFT CONNECTION

(71) Applicant: Carl ZEISS 3D Automation GmbH, Aalen (DE)

(72) Inventor: Frank Richter, Heidenheim (DE)

( * ) Notice: Subject to any disclaimer, the term of this patent is extended or adjusted under 35 U.S.C. 154(b) by 111 days.

(21) Appl. No.: 14/379,685

(22) PCT Filed: Feb. 20, 2013

(86) PCT No.: PCT/DE2013/000089
§ 371 (c)(1),
(2) Date: Aug. 19, 2014

(87) PCT Pub. No.: WO2013/123927
PCT Pub. Date: Aug. 29, 2013

(65) Prior Publication Data
US 2016/0018208 A1 Jan. 21, 2016

(30) Foreign Application Priority Data
Feb. 20, 2012 (DE) .................. 10 2012 003 223

(51) Int. Cl.
*G01B 5/012* (2006.01)
*G01B 5/016* (2006.01)

(52) U.S. Cl.
CPC .............. *G01B 5/012* (2013.01); *G01B 5/016* (2013.01)

(58) Field of Classification Search
CPC ................................ G01B 5/016; G01B 5/012
USPC ............ 33/502, 503, 556, 559, 644; 73/1.81
See application file for complete search history.

(56) References Cited

U.S. PATENT DOCUMENTS

| | | | | |
|---|---|---|---|---|
| 3,520,063 A | * | 7/1970 | Rethwish | B23Q 35/34 33/558 |
| 3,722,604 A | * | 3/1973 | Lesher | E21B 11/005 111/99 |
| 3,869,799 A | * | 3/1975 | Neuer | G01B 7/012 33/23.11 |
| 3,922,791 A | * | 12/1975 | Maxey, Sr. | G01B 7/012 33/501 |
| 4,158,919 A | * | 6/1979 | McMurtry | G01B 7/012 33/505 |
| 4,270,275 A | * | 6/1981 | McMurtry | G01B 7/002 33/559 |
| 4,397,188 A | * | 8/1983 | Bansevichus | G01B 7/012 33/561 |
| 4,530,160 A | * | 7/1985 | Feichtinger | G01B 5/012 33/559 |
| 4,547,971 A | * | 10/1985 | Imazeki | G01B 5/012 33/644 |

(Continued)

FOREIGN PATENT DOCUMENTS

| | | |
|---|---|---|
| CH | 644 688 | 8/1984 |
| DE | 100 40 756 | 3/2002 |

(Continued)

*Primary Examiner* — R. A. Smith
*Assistant Examiner* — Tania Courson
(74) *Attorney, Agent, or Firm* — Kagan Binder, PLLC

(57) ABSTRACT

The invention relates to a probing means for coordinate measuring machines, with a probe tip having a recess and a shaft penetrating with a shoulder into the recess. According to the invention, the recess tapers towards the interior of the probe tip and the shaft has a construction complementary thereto.

27 Claims, 6 Drawing Sheets

(56) References Cited

U.S. PATENT DOCUMENTS

| | | | | |
|---|---|---|---|---|
| 4,972,597 A * | 11/1990 | Kadosaki | ............ | G01B 11/007 33/556 |
| 5,083,884 A * | 1/1992 | Miller | ............ | F01L 1/14 123/90.61 |
| 5,103,572 A * | 4/1992 | Ricklefs | ............ | G01B 11/007 33/558 |
| 5,270,664 A * | 12/1993 | McMurtry | ............ | G01B 7/023 324/662 |
| 5,315,259 A * | 5/1994 | Jostlein | ............ | G01B 7/023 324/662 |
| 5,345,690 A * | 9/1994 | McMurtry | ............ | G01B 5/012 33/558 |
| 5,517,124 A * | 5/1996 | Rhoades | ............ | G11B 5/3163 324/662 |
| 5,526,576 A * | 6/1996 | Fuchs | ............ | G01B 21/04 33/503 |
| 5,659,969 A * | 8/1997 | Butler | ............ | G01B 11/007 33/556 |
| 5,884,410 A * | 3/1999 | Prinz | ............ | G01B 7/012 33/556 |
| 6,370,788 B1 * | 4/2002 | Hellier | ............ | G01B 5/0011 33/1 M |
| 6,513,253 B2 * | 2/2003 | Matsuda | ............ | G01B 21/042 33/502 |
| 6,609,308 B2 * | 8/2003 | Osterstock | ............ | G01B 5/016 33/559 |
| 6,918,188 B2 * | 7/2005 | McMurtry | ............ | B23Q 1/5462 33/558.2 |
| 7,316,076 B2 * | 1/2008 | Ruijl | ............ | G01B 5/012 33/556 |
| 7,493,803 B2 * | 2/2009 | Kelleher | ............ | E02D 1/022 73/84 |
| 7,891,109 B2 * | 2/2011 | Weston | ............ | G01B 7/012 33/558 |
| 8,144,340 B2 * | 3/2012 | McFarland | ............ | G01B 11/007 250/559.29 |
| 8,816,702 B2 * | 8/2014 | Tan | ............ | G01B 7/012 324/662 |
| 8,926,518 B2 * | 1/2015 | Culjat | ............ | A61B 8/14 600/437 |
| 8,932,208 B2 * | 1/2015 | Kendale | ............ | A61B 1/00096 600/114 |
| 9,316,473 B2 * | 4/2016 | Jensen | ............ | G01B 5/012 |
| 2003/0084584 A1 | 5/2003 | Osterstock | | |
| 2003/0209051 A1 * | 11/2003 | McMurtry | ............ | B23Q 1/5462 73/1.79 |
| 2006/0000101 A1 * | 1/2006 | Nakagawa | ............ | G01B 5/28 33/559 |
| 2007/0137057 A1 * | 6/2007 | Lewicka-Schafer | ..... | G01B 1/00 33/559 |
| 2008/0016711 A1 * | 1/2008 | Baebler | ............ | G01B 7/012 33/559 |
| 2016/0097626 A1 * | 4/2016 | Miess | ............ | G01B 5/016 33/503 |

FOREIGN PATENT DOCUMENTS

| | | |
|---|---|---|
| DE | 10 2006 033 442 A1 | 1/2008 |
| EP | 1 024 341 | 8/2000 |
| JP | 2000 292114 | 10/2000 |

\* cited by examiner

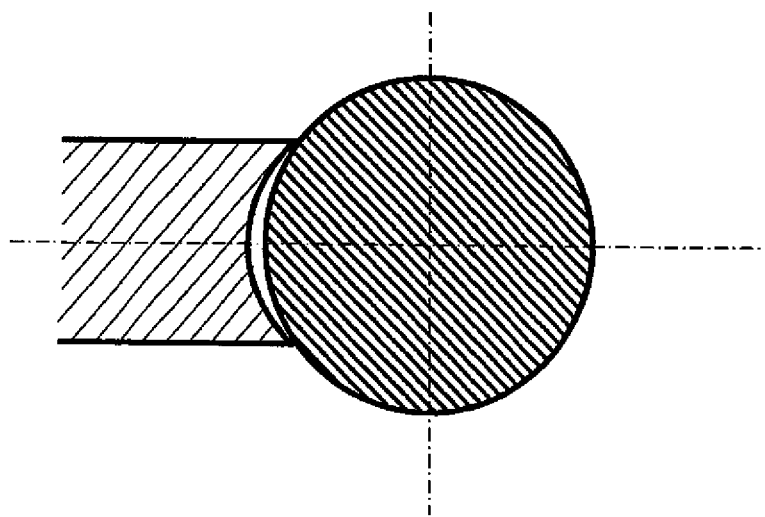
Fig. 4 Stand der Technik

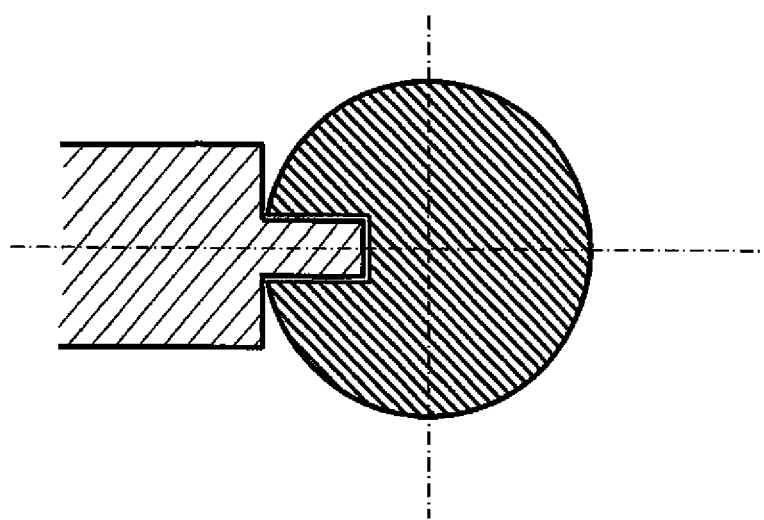
Fig. 5 Stand der Technik

BALL-SHAFT CONNECTION

RELATED APPLICATION

This application claims the benefit from International Application No. PCT/DE2013/000089, filed Feb. 20, 2013, which in turn claims priority from German Application having number 10 2012 003 223.4, filed on Feb. 20, 2012, both of which are incorporated herein by reference in their entireties.

The present invention relates to the subject-matter claimed in the preamble and thus relates to probes for coordinate measuring machines.

Coordinate measuring machines are used for exactly determining the geometry of objects. For this purpose, the coordinate measuring machine comprises an arm to which a probe is attached and which is then moved with this probe towards the workpiece in order to generate a contact-indicating signal when contacting the workpiece. The geometrical dimensions can be determined by simultaneously detecting where the arm is located when the contact-indicating signal is generated.

This can be realized, e.g., by calibration in that first a known body is scanned by means of the probe on the arm and/or in that known positions are approached therewith and then the workpiece is scanned by means of the same arrangement. For achieving exact measurements, it is necessary in this approach that the arm or the probing means is not subject to changes between calibration and the actual measurement of the workpiece.

Such changes might already be caused, for example, by temperature changes because the material of the probing means expands when being heated. In order to avoid such effects, probing means having a very low thermal expansion are already used. Problems likewise occur when the probing means gradually changes while touching the workpiece, for example because it is moved over the workpiece thereby continuously contacting it ("in a scanning manner") so that its front end is subject to abrasion or abrades material from the workpiece. It is clear that these two approaches change the geometry of the probing means and thus falsify the measurement. In order to reduce this effect, the front ends of the probing means which contact the workpiece are provided with probe tips which are often made from ruby, diamond or other particularly hard materials. Also these probe tip materials allow a highly precise processing. These probe tips are manufactured into different geometries, e.g. into balls, cylinders or the like, and firmly attached to a shaft—which typically has a fixing thread at its arm—by means of which they can be changed.

However, the measuring accuracy is not only reduced when the probe tip is subject to gradual wear. Also an incurred mechanical impairment of the integrity of the probing means has a negative effect. Therefore, the connection of the different parts of the probing means is of particular importance to the measurement.

Different techniques are used for connecting parts of probing means. For example, the threaded adapter and the shaft are often bonded, soldered or shrunk. However, the probe tip and the shaft are as a rule bonded or soldered. This portion is particularly prone to mechanical damage.

Therefore, it is known in the prior art that for bonding a solid ball to the face of a cylindrical shaft, a hollow calotte being complementary to the ball shape or a conical depression is introduced into the face of the shaft (see FIG. 4), which offers the advantage that the highly precise ball does not have to be processed. However, because of the very small bonding surface, the bonding forces are low.

In the prior art, balls are therefore also bonded by making a cylindrical bore into the ball and providing a cylindrical pin at the shaft, said pin having a slightly smaller diameter than the bore in the ball, so that the ball can be bonded to the pin by means of an adhesive (see FIG. 5). Because the surface of the shaft is many times larger than the wetted surface of the calotte of the ball, higher bonding forces are achieved.

However, the connection to a pin is related with the problem that while the bonding surface is enlarged and thus the bonding improved, measurements are subject to errors in case of tilting or jamming caused by a damaged bond. For example, the ball rotates on the shaft and, caused by this play, leads to undesired deviations in the measuring results. Therefore, despite a comparatively high effort in connection with the introduction of the cylindrical bore into the balls made from a hard ceramic material or the like, the results to be achieved therewith ultimately need to be improved.

The solution to this problem is claimed in independent form. Preferred embodiments can be found in the dependent claims.

In accordance with a first basic idea, the present invention thus suggests a probing means for coordinate measuring machines comprising a probe tip having a recess and a shaft which penetrates with a projection into the recess, wherein it is further intended that the recess tapers towards the interior of the probe tip and the shaft has a construction which is complementary thereto.

It is a basic idea of the invention that the tapering allows on the one hand a large bonding surface and thus high holding forces but on the other hand prevents the probe tip from tilting or jamming when the bond is damaged. Rather, when the bond is damaged, the probe tip will readily loosen from the shaft. This, in turn, is highly advantageous because it is on the one hand readily visually noticeable and because on the other hand, if the measurements are carried out without visual control in a semi-automatic or fully-automatic manner, the missing probe tip leads to extremely large measuring errors in view of the measuring accuracy, so that the defect can immediately be identified automatically because typical measuring tolerances are exceeded and it is prevented that falsified values are recorded in an unrecognized manner by means of a damaged measuring arrangement.

It is advantageous if the opening angle of the taper of the probing means is larger than 5°, preferably larger than 15°. This opening angle is typically sufficient for guaranteeing that the probe tip does fall off the shaft when the bond is damaged. At the same time it guarantees a good producibility, e.g. by laser ablation.

It is also advantageous if the taper of the probing means is cone-shaped or pyramidal. The cone or pyramidal shape facilitates assembly. Moreover, when the probing means has a pyramidal shape or the shape of a truncated pyramid, the connection is also so positively locking that the stability of the connection against damage is increased and helps to improve the measuring accuracy with an undamaged arrangement.

It is possible and advantageous if the taper in the interior of the probe tip ends in a blunted manner. Thus, processing is facilitated without significantly affecting the advantages to be achieved by the invention.

It is also pointed out that the depression or recess in the probe tip body can be slightly larger than the corresponding complementary construction so as to take into account the thickness of an adhesive layer (typically after curing) or the like.

Moreover, it is advantageous if the recess of the probing means is formed as a truncated pyramid with 4 to 8 facets. This number of facets allows a simple production and at the same time guarantees a particularly good positive locking.

It is also advantageous if the projection of the shaft of the probing means is bonded into the tapering recess of the probe tip. However, also other ways of connection such as soldering or the like are possible.

Protection is also sought for a method for manufacturing a probing means for coordinate measuring machines according to the invention, wherein the recess is made by laser ablation. Thanks to the shape of the recess according to the invention, laser ablation can be readily used without rotation of the probe tip body about the axis of the cylinder being necessary for ablations. Rather, the recess can be made when the workpiece is stationary. Both the pin provided at the shaft and the complementary negative shape of the probe tip, which is typically formed as a ball, can thus be manufactured quickly and economically by means of laser ablation.

It is advantageous if, in accordance with the method, an opening angle of the taper is generated which is larger than the convergence angle of the focused laser beam used for ablation.

It is also pointed out, however, that the recess and/or the complementary projection can also be made by using alternative and/or additional methods. Mechanical methods, electro-erosive methods, etching methods, electron and/or ion beam ablation are mentioned as examples.

In the following, the invention is described exemplarily on the basis of the drawings in which FIG. 1a shows a section through a probing means of the present invention with the projection on the shaft and the recess in the probe tip being manufactured in an accurately fitting manner;

FIG. 2b shows a shaft for the embodiment of the invention according to FIG. 2a;

FIG. 3b shows a shaft for the embodiment of the invention according to FIG. 3a;

FIG. 4 shows a section through a probing means of the prior art;

FIG. 5 shows a section through a probing means of the prior art.

Figure 1A:
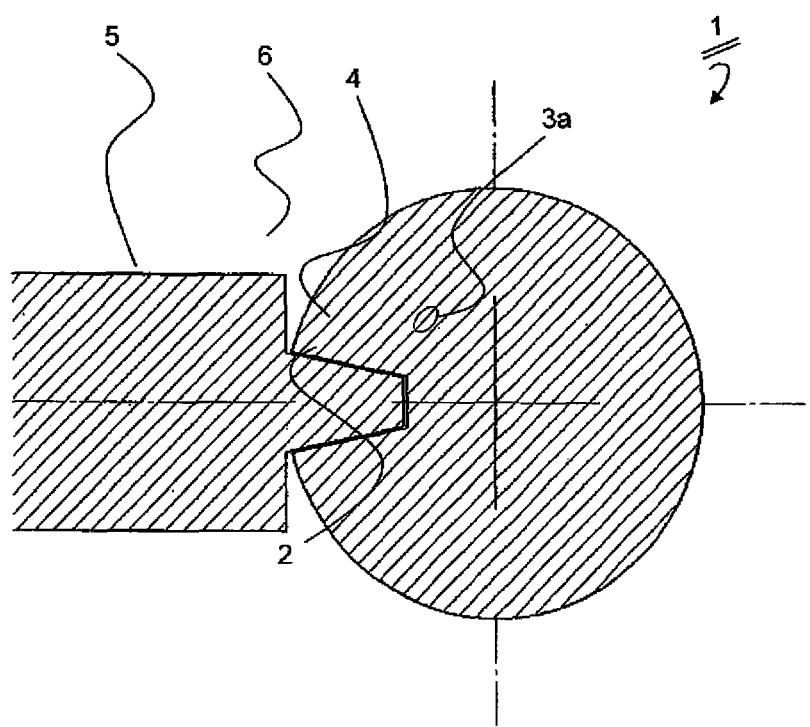
FIG. 1b shows a section through a probing means of the present invention with a slightly too short projection on the shaft.

In accordance with FIG. 1, in the probing means 1 for coordinate measuring machines (not shown), which is generally referred to as 1 and comprises a probe tip 3 having a recess 2 and a shaft 5 penetrating with a projection 4 into the recess 2, it is intended that the recess 2 tapers towards the interior of the probe tip 3a and the shaft 5 has a construction of the projection 4 which is complementary thereto.

In the shown embodiment, the probing means 1 is realized as a probe with a straight shaft 5 and a ball-shaped tip 3. It can be used for both scanning and touching measurements.

The transition arrangement from the probing means shank 5 to the coordinate measuring machine (not shown) is not shown and can readily be formed in a manner known per se.

In the present case, the recess 2 is, as preferred, less deep than the radius of the probe tip body 3. Thus, the integrity of the probe tip body 3 is affected at the most little by the recess. In the present case, the opening angle of the recess 2, which is shown in FIG. 1b as the angle ALPHA for the sake of clarity, is so large that in case the bond is damaged, the probe tip body loosens from the shaft. For example, the angle is about 10°.

In the present case, the probe tip 3 is made from ruby (i.e. a substantially mono-crystalline aluminum oxide) as hard material. However, other materials which are common for probe tip bodies can also be used. Without a limiting exclusion of further materials, in particular sintered aluminum oxide, hard metal, sapphire, silicon nitride, zirconium oxide and diamond are mentioned as preferred materials. The probe tip 3 is shown to be a highly-precise ball, but of course also other geometries of the probe tip body can be used without leaving the scope of the invention, i.a. ball disks, cones, cylinders.

In the present example, the shaft 5 is made from hard metal. However, also other shaft materials, for example materials common in the prior art, can also be readily used. At least stainless steel, carbon fiber reinforced plastics as well as ceramics are explicitly mentioned.

Figure 1B:
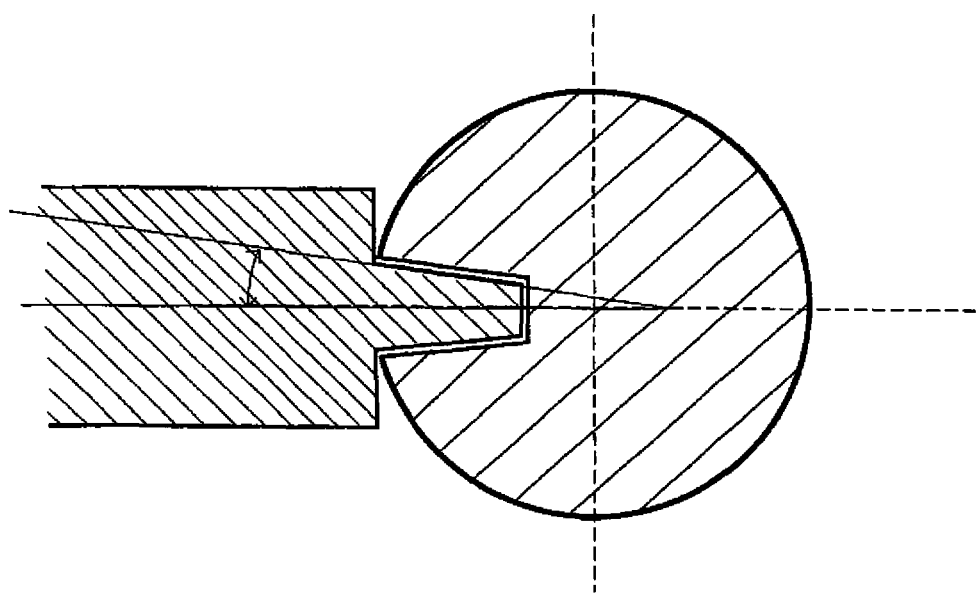
Figure 2A:
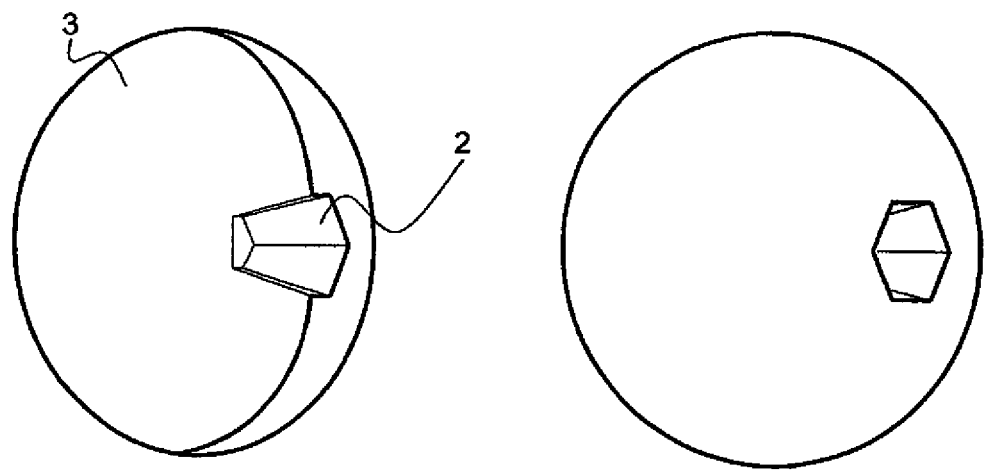
FIG. 2a shows, both as a sectional view and a perspective view, a probe tip body for the probing means according to FIG. 1 of the present invention for an embodiment of the invention with a recess having the shape of a truncated pyramid.
Figure 2B:
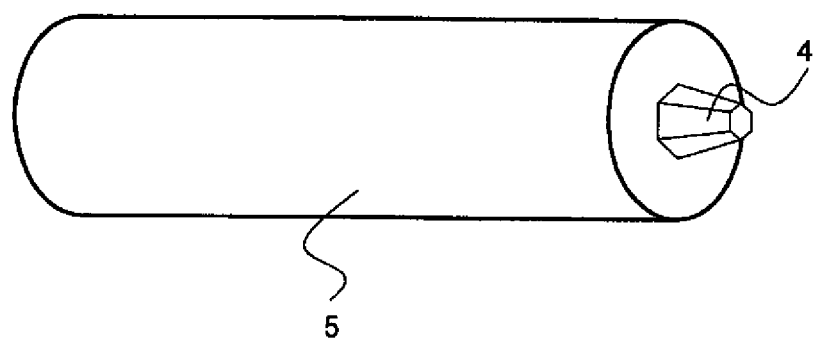

In the example of FIG. 1a, see the illustrations of FIGS. 2a and 2b, the recess 2 is formed as a recess having the shape of a truncated pyramid and having six facets and a face being formed by laser ablation. The shaft 5 has a complementary counter-shape which is made from a round piece of solid material from the shaft material also by means of laser ablation.

FIG. 1 shows that, as preferred, the recess 2 in the probe tip body 3 and the projection 4 on the shaft 5 are complementary and fit together in such a manner that the probe tip body contacts the shaft 5 only with its projection 4 but not with the projection 6 surrounding the projection 4 on the shaft 5. Adhesive, which has possibly been introduced in excess, can thus be squeezed out of the recess 2 and moreover the visual control of the transitional area is improved. FIG. 1b shows, however, that also in case of a slightly shorter projection 4 on the shaft 5, a perfect connection can still be achieved.

The arrangement is made and used as follows:

First, a probe tip blank and a shaft blank are provided. A recess 2 is made in the probe tip blank by means of a focused laser beam and a projection is made on the shaft blank. The laser beam converges onto the focus with an angle smaller than 10°. Then the shaft is processed by laser ablation for forming a projection which is complementary to the recess 2.

It is also mentioned that the recess 2 and the complementary projection can alternatively and/or additionally be made by using other methods, e.g., mechanical methods, electro-erosive methods, etching methods, electron or ion beam ablation.

Then the shaft and the probe tip body are bonded to each other by using suitable adhesives.

After assembling the arrangement to a coordinate measuring machine and calibration, touching or scanning measurements can be carried out. The truncated pyramid shape of projection and recess guarantees an increased stability of the bond and thus a high dimensional accuracy.

If the bond is affected by impacts or the like, the probe tip body will loosen from the shaft without tilting or jamming, so that the defect becomes directly visible.

Figure 3A:
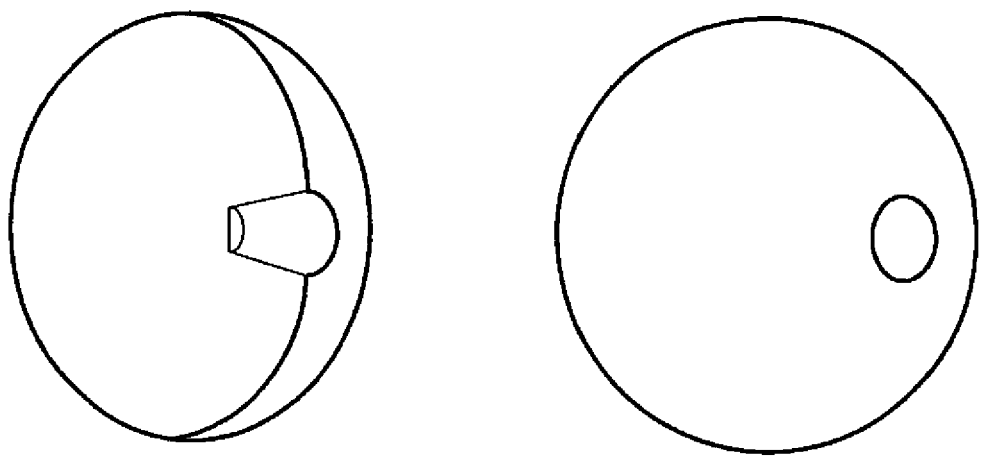
FIG. 3a shows, both as a sectional view and a perspective view, a probe tip body for a probing means according to the invention for an embodiment of the invention with a recess of truncated pyramid form.
Figure 3B:
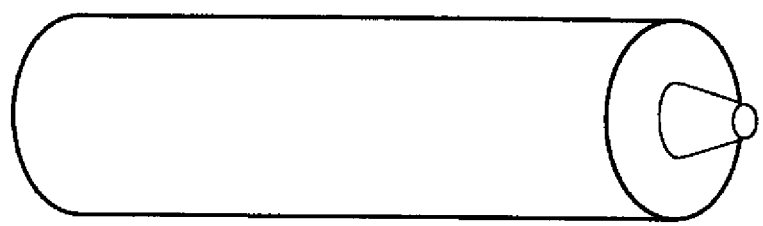

While FIG. 2 shows a recess 2 in the probe tip body 3 and a complementary projection on the shaft 5, which has the shape of a truncated pyramid, FIG. 3 shows an alternative embodiment in which the recess is realized as a negative shape for a truncated cone (which is in the present case understood as a "recess having the shape of a truncated cone", see above). Because of the circular cross-section of the truncated cone, in case of a section through the axis, this arrangement does not offer the advantage of an additional positive locking.

The invention claimed is:

1. A probing means for coordinate measuring machines, the probing means having one end for contacting a workpiece to be measured, the probing means comprising
a shaft,
a probe tip provided at the end of the probing means for contacting the workpiece to be measured,
the probe tip being fixedly attached to the shaft,
the probe tip having a recess,
the shaft having a projection,
the projection penetrating into the recess,
wherein the recess tapers towards an interior of the probe tip and the shaft has a shape which is complementary thereto, and
wherein the recess is formed as a truncated pyramid with 4 to 8 facets.

2. The contact probe of claim 1, wherein the probe tip is made from a substance selected from the group consisting of: ruby (mono-crystalline aluminum oxide), sintered aluminum oxide, hard metal, sapphire, silicon nitride, zirconium oxide, and diamond.

3. The probing means of claim 1 wherein the recess does not include threading and the projection does not include threading.

4. A contact probe for coordinate measuring machines, comprising:
a shaft having a projection,
the projection forming one of
a cone,
a frustrated cone,
a pyramid,
and a truncated pyramid;
a probe tip fixedly attached at one end of the shaft for contacting a workpiece to be measured and having a tapered recess,
the tapered recess tapering towards an interior of the probe tip with an opening angle of the taper larger than 5°,
the tapered recess being a complementary negative form of the projection; and
a soldering or adhesive bonding provided between the projection and the tapered recess for fixedly attaching the projection in the tapered recess of the probe tip.

5. A contact probe for coordinate measuring machines according to claim 4, wherein the projection forms a truncated pyramid.

6. A contact probe for coordinate measuring machines according to claim 5, wherein the opening angle of the taper is larger than 15°.

7. A contact probe for coordinate measuring machines according to claim 6, wherein the tapered recess ends in a blunted manner in the interior of the probe tip.

8. A contact probe for coordinate measuring machines according to claim 6, wherein the recess does not include threading, the projection does not include threading and the tapered recess ends in a blunted manner in the interior of the probe tip.

9. The contact probe for coordinate measuring machines according to claim 5, wherein the recess is formed as a truncated pyramid with 4 to 8 facets.

10. A contact probe for coordinate measuring machines according to claim 9, wherein the opening angle of the taper is larger than 15°.

11. The contact probe of claim 5, wherein the tapered recess ends in a blunted manner in the interior of the probe tip and the probe tip is made from a substance selected from the group consisting of: ruby (mono-crystalline aluminum oxide), sintered aluminum oxide, hard metal, sapphire, silicon nitride, zirconium oxide, and diamond.

12. A contact probe for coordinate measuring machines according to claim 4, wherein the projection forms a frustrated cone.

13. A contact probe for coordinate measuring machines according to claim 12, wherein the tapered recess ends in a blunted manner in the interior of the probe tip.

14. The contact probe of claim 13, wherein the probe tip is made from a substance selected from the group consisting of: ruby (mono-crystalline aluminum oxide), sintered aluminum oxide, hard metal, sapphire, silicon nitride, zirconium oxide, and diamond.

15. The probing means of claim 14, wherein the recess does not include threading and the projection does not include threading.

16. The probing means according to claim 14, wherein the projection is adhesively bonded into the recess and the recess in the probe tip is larger than the size of the projection by an amount corresponding to the thickness of the adhesive.

17. The probing means according to claim 16, wherein the opening angle is larger than 15°.

18. A method for manufacturing a probing means for coordinate measuring machines according to claim 4, wherein the recess is made by laser ablation.

19. The method according to claim 18, wherein an opening angle of the taper is made which is larger than the opening angle of a focused laser beam used for ablation.

20. A probing means for coordinate measuring machines, the probing means having one end for contacting a workpiece to be measured, the probing means comprising
a shaft,
a probe tip provided at the end of the probing means for contacting the workpiece to be measured,
the probe tip being fixedly attached to the shaft,
the probe tip having a recess
the shaft having a projection,
the projection penetrating into the recess
wherein the recess tapers towards an interior of the probe tip and
the shaft has a shape which is complementary thereto, and wherein
the shaft includes
a proximal end,
a distal end, and
a longitudinal axis extending between the proximal end and the distal end, and the projection is formed at the distal end and has a longitudinal axis that aligns with the longitudinal axis of the shaft, and
the projection has a shape of a truncated pyramid.

21. A contact probe for coordinate measuring machines, the contact probe having one end for contacting a workpiece to be measured,
the contact probe comprising
a shaft including
  a proximal end,
  a distal end, and
    a longitudinal axis extending between the proximal end and the distal end,
    a projection formed at the distal end with a shoulder surrounding the projection,
a probe tip provided at the end of the probing means for contacting the workpiece to be measured,
  the probe tip being made from a substance selected from the group consisting of: ruby (mono-crystalline aluminum oxide), sintered aluminum oxide, hard metal, sapphire, silicon nitride, zirconium oxide, and diamond,
  the probe tip being fixedly attached to the shaft,
the probe tip having a tapered recess,
the projection forming one of a frustrated cone and a truncated pyramid;
the tapered recess being a complementary negative form of the projection and
  the tapered recess ends in a blunted manner in the interior of the probe tip,
the projection penetrating into the recess,
  the projection being formed at the distal end with a shoulder surrounding the projection,
  the tapered recess tapering towards an interior of the probe tip with an opening angle larger than 5°
  and a soldering or an adhesive bonding for fixedly attaching the probe tip to the shaft is provided between the projection and the recess.

22. The contact probe according to claim 21, wherein the probe is soldered to the projection.

23. The contact probe according to claim 22, wherein the tip has a ball shape.

24. The contact probe according to claim 23, wherein the angle of the taper is larger than 15°.

25. The contact probe according to claim 21, wherein the probe is adhesively bonded to the projection.

26. The contact probe according to claim 25, wherein the tip has a ball shape.

27. The contact probe according to claim 26, wherein the angle of the taper is larger than 15°.

* * * * *